United States Patent [19]

Gallert

[11] Patent Number: 5,019,800
[45] Date of Patent: May 28, 1991

[54] SYSTEM FOR MEASURING THE OIL LEVEL OF AN OIL PAN OF THE CRANKCASE OF AN INTERNAL COMBUSTION ENGINE

[76] Inventor: Gustav Gallert, Hasenweg 19, 4230 Wesel, Fed. Rep. of Germany

[21] Appl. No.: 414,364

[22] Filed: Sep. 29, 1989

[30] Foreign Application Priority Data

Oct. 1, 1988 [DE] Fed. Rep. of Germany ....... 3833453

[51] Int. Cl.$^5$ .............................................. B60Q 1/00
[52] U.S. Cl. .................................. 340/450.3; 340/618
[58] Field of Search ...................... 340/450, 450.3, 618

[56] References Cited

U.S. PATENT DOCUMENTS 3,605,086  9/1971  Triska .
3,872,429  9/1973  Arney .
4,417,232  11/1983  Tewfik .
4,935,727  6/1990  Re Fiorentin et al. ......... 340/450 X

FOREIGN PATENT DOCUMENTS 1576367  4/1970  Fed. Rep. of Germany .
2405862  8/1974  Fed. Rep. of Germany .
2308370  9/1974  Fed. Rep. of Germany .
1017241  12/1952  France .

*Primary Examiner*—Joseph A. Orsino
*Assistant Examiner*—Brian R. Tumm
*Attorney, Agent, or Firm*—Watson, Cole, Grindle & Watson

[57] ABSTRACT

The foregoing and additional objects are obtained by the oil measuring system according to the present invention. A first oil level measuring device is in fluid communication with the oil pan and generates a first signal indicative of the oil level within the first measuring device. A second oil level measuring device is also in fluid communication with the oil pan and generates a second signal indication of the oil level with the second measuring device. An imaginary line passes from the second measuring device, through the middle of the oil pan, and to the first measuring device. Also provided is a means for indicating the oil level in the oil pan in response to the first and second signals. Accordingly, the oil level may be checked without using a standard dipstick. Further, the present system is effective regardless of the tilt of the engine.

27 Claims, 2 Drawing Sheets

SYSTEM FOR MEASURING THE OIL LEVEL OF AN OIL PAN OF THE CRANKCASE OF AN INTERNAL COMBUSTION ENGINE

BACKGROUND OF THE INVENTION

1. Technical Field of the Invention

The present invention relates to a system for measuring the oil level in the oil pan of the crankcase of an internal combustion engine, and more particularly to such a system for use in motor vehicles and motor boats.

2. Discussion of the Related Art

The oil pan of the crankcase of an internal combustion engine should contain an amount of oil between a maximum level and a minimum level to ensure optimum operation of the engine. However, the oil level drops over the course of time as the operating engine consumes oil. It is therefore necessary to measure the oil level with an oil measuring rod and, if necessary, add oil to the crankcase at specific time intervals or after specific driving performances of the engine. Unfortunately, this maintenance is occasionally forgotten so that the oil level in the oil pan gets too low, thereby resulting in engine damage from increased friction.

Accordingly, it is an object of the present invention to provide a system which displays the oil level of the engine at the dashboard when the ignition is turned on.

It is a further object of the present invention to accomplish the foregoing without interfering with the flow of oil from the oil pan.

It is yet another object of the present invention to accomplish the foregoing objects regardless of the tilt of the engine.

Additional objects and advantages of the present invention will become apparent from the drawing and specification which follow.

SUMMARY OF THE INVENTION

The foregoing and additional objects are obtained by the oil measuring system according to the present invention. A first oil level measuring device is in fluid communication with the oil pan and generates a first signal indicative of the oil level within the first measuring device. A second oil level measuring device is also in fluid communication with the oil pan and generates a second signal indicative of the oil level within the second measuring device. An imaginary line passes from the second measuring device, through the middle of the oil pan, and to the first measuring device. Also provided is a means for indicating the oil level in the oil pan in response to the first and second signals.

In this manner a measuring system is obtained with which the oil level of an internal combustion engine can be measured outside the oil pan. The oil measuring devices are arranged on a common horizontal plane and extend over such a height that even when the vehicle is tilted, the oil level is measured reliably in both oil level measuring devices. The oil pan and the two oil level measuring devices represent communicating vessels so that the oil surface in each forms a horizontal level or plane entirely independent of the orientation of the motor vehicle. When the motor vehicle assumes a tilted position, a larger value is measured in the oil level measuring device located on the lower level than in the oil level measuring device located on the higher level. The mean value of the two measured values equals the oil level in the oil pan.

Each individual oil level measuring device produces an electrical signal corresponding to the measured oil level, wherein either the sum of the measured signals or the mean of the individual signals is displayed via an indicating device on the dashboard. Thus, it is not necessary to determine the oil level by means of the oil measuring rod at specific time intervals.

DETAILED DESCRIPTION OF THE PREFERRED EMBODIMENTS

Figure 1:
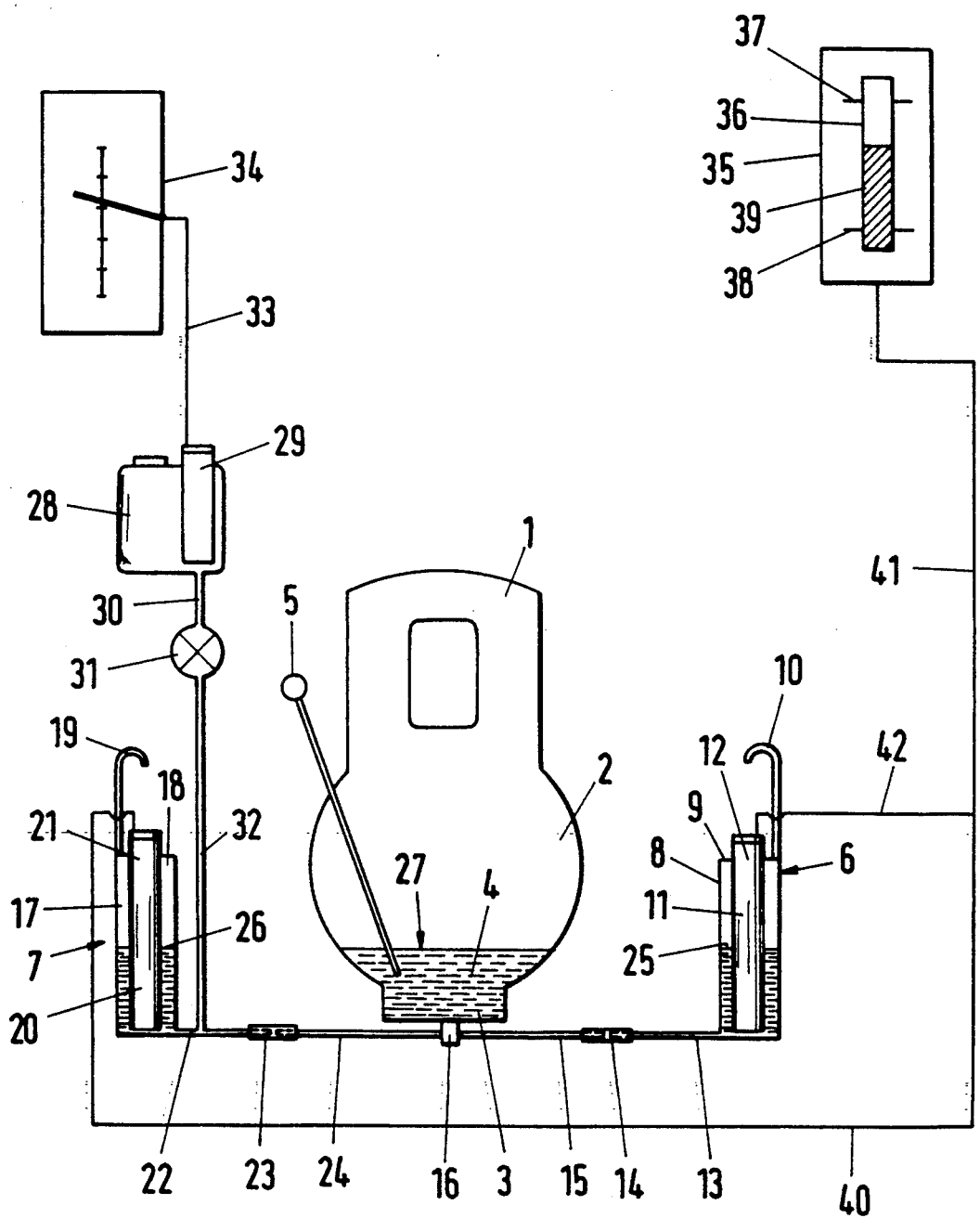
FIG. 1 is a schematic front view of an internal combustion engine employing the oil sensing system of the present invention.

Referring to FIG. 1, a system for measuring the oil level in the oil pan of the crankcase of an internal combustion engine is shown. An engine block 1, which is shown only schematically, has a crankcase 2 and an oil pan 3 filled with a specific quantity of oil 4. A standard hand measuring rod or dipstick 5 is immersed into the oil pan 3.

When viewed from the longitudinal direction of the vehicle, oil level measuring devices 6, 7 are equidistantly provided on both sides of the engine 1. The oil level measuring device 6 comprises a measuring container 8 which is closed on its upper end 9 and has an air vent 10. An immersion tube sensor 11 is arranged in the measuring container 8 and has an upper end 12 projecting from the container. The sensor may be any other known sensor, a lever sensor. The sensed oil level is then converted into an electrical signal. The measuring container 8 is connected to an oil outlet 16 located at the lowest point of the oil pan 3 by means of an oil line 13, a flexible terminal clamp 14 and another oil line 15.

Similarly, oil level measuring device 7 comprises a measuring container 17 which is closed at its upper end 18 and has an air vent 19. An immersion tube sensor 20, which projects with its upper end 21 from the measuring container 17, is provided in the measuring container 17. The sensed oil level is then converted to an electrical signal. The measuring container 17 is connected to the oil outlet 16 of the oil pan 3 by means of an oil line 22, a flexible terminal clamp 23 and an oil line 24.

As a result of the communication between the measuring containers 7 and 8 and the oil pan 3, the oil level 25 in the measuring container 8 and the oil level 26 in the measuring container 7 are at the same level as the oil level 27 in the oil pan 3 when the engine is not tilted.

An oil supply container 28 is provided with an oil level measuring device 29. A pipe line 30 leads from the oil supply container 28, through a metering pump 31 and a pipe line 32 to the oil line 22. The oil level in the oil supply container 28 is given to an oil supply indicator 34 by means of an electric line 33. Accordingly, the oil pan 3 can be refilled with oil for the supply container 28. The metering pump 31 can supply a specific quantity of oil to the oil pan. In addition, this pump can run for a requisite amount of time via a time relay or a time switch, depending on the predetermined needs, to fill the oil pan.

An oil level indicator 35 is provided on the dashboard. A marking 37 for the maximum and a marking 38 for the minimum of the oil level are attached to a scale 36 of the oil level indicator 35. The scale 36 extends somewhat beyond both markings 37 and 38 so that an oil level Can be indicated that lies below the admissible minimum or above the admissible maximum. In the embodiment shown, the display 39 indicates a preferred oil level within the range defined by the two markings 37 and 38.

Electrical lines 40 and 41 lead from the immersion tube sensor 20 to oil level indicator 35. Similarly, the immersion tube sensor 11 is connected to the oil level indicator by means of the electrical lines 42 and 41. The measured signals determined in both immersion tube sensors 11 and 20 are fed to the oil level indicator by means of the lines 40, 41, 42 so that the determined oil level is indicated at the oil level indicator. Preferably the average of the individual signals is fed into the indicator. The indicator may be adjustable and if so the sum of the individual signals is fed into the indicator.

Accordingly, the oil level may be quickly inspected by the operator by glancing at the dashboard indicator. Thus, checking via standard dipstick 5 is not necessary. Nonetheless, it is recommended that the dipstick be retained to permit an inspection of the oil level which is independent of the present invention.

Figure 2:
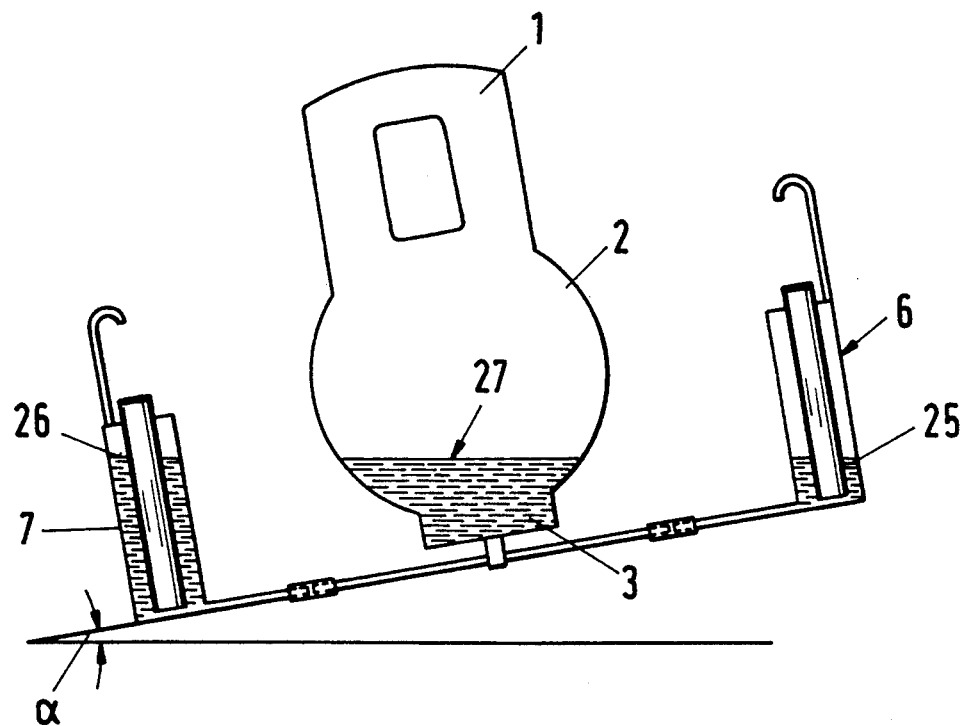
FIG. 2 is a view corresponding to FIG. 1 with the vehicle in a tilted position.

FIG. 2 shows this configuration in a position tilted by angle $\alpha$. It is apparent from this figure that the oil levels 25, 26 and 27 are in a common horizontal plane so that the oil level is low in the measuring container 6 and high in the measuring container 7. The mean value from the two oil levels in the measuring containers 6 and 7 corresponds to the oil level in the oil pan 3.

Figure 3:
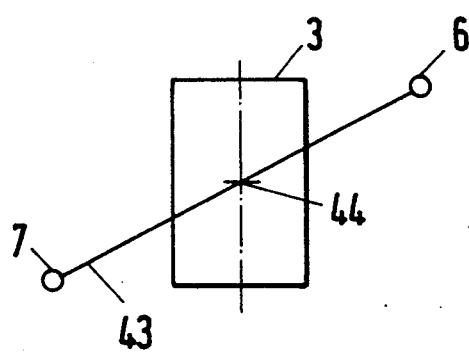
FIG. 3 is a schematic horizontal cross-section of FIG. 1 on a level with the oil pan.

In FIG. 3, two oil level measuring devices 6, 7 are provided that are equidistantly arranged on both sides of the oil pan 3. The two oil level measuring devices 6 and 7 are arranged relative to one another such that an imaginary straight line 43 extends between them and through the middle 44 of the oil pan 3. With this arrangement it is possible to reliably determine the oil level in the oil pan 3 when the vehicle is tilted.

Figure 4:
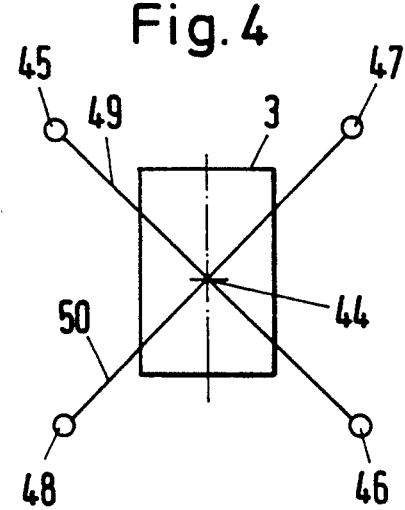
FIG. 4 is also a schematic horizontal cross-section of FIG. 1 on a level with the oil pan.

In the configuration shown in FIG. 4, four oil level measuring devices 45, 46, 47, and 48 are symmetrically arranged on a common horizontal plane outside the oil pan 3. Accordingly, the oil level 27 in the oil pan 3 is measured accurately at any tilted position of the vehicle. The measuring devices 45 and 46 are arranged in such a manner relative to one another and to the oil pan 3 that an imaginary straight line 49 extends between the measuring devices 45 and 46 and through the middle 44 of oil pan 3. Similarly, an imaginary straight line 50 extends between the measuring devices 47 and 48 and through the middle 44 of oil pan 3. Preferably, the paired measuring devices, i.e., devices 45 and 46 and devices 47 and 48, are located equidistantly from the middle 44 of the oil pan 3. If in the exceptional case irregular locations of the measuring devices are necessary due to space considerations or any other reasons, the generated signals must be correlated with those unequal distances before being fed to the oil level indicator 35.

The oil level measuring devices may be located on the frame of the vehicle powered by the engine or on diagonal trussing which supports the engine. Accordingly, vibrations of the operating engine are not transferred to the measuring devices. In addition, the flexible terminal clamps located in the respective oil lines prevent vibrations from being transmitted to the measuring devices if the other oil lines are made of metal.

The oil level is measured continuously with the engine at a standstill, and in particular not until after the engine has run long enough to allow the oil 4 to be again collected in the oil pan 3 to such a degree that the oil level can be adequately measured with precision. Depending on the type of construction of the oil level indicator 35 used, the measurement can be performed either with a switch provided to this end or automatically when the ignition is turned on or off. In addition, the measurement can be performed at different points in time, e.g., (1) prior to the start of the trip when the engine is cold, (2) before driving on when the trip is interrupted with the engine at a standstill, or (3) after the end of the trip.

According to the first possibility, the measurement is performed with a switch provided to this end before the cold engine is started or during a break in the trip with the engine at a standstill. When the trip is interrupted, some time must elapse after the ignition is turned off for the oil 4 to collect in the oil pan 3 and until the oil level has come to rest.

According to the second possibility, the measurement is performed automatically when the ignition is turned on prior to starting the engine. In this case the ignition key is turned to the first step of the ignition lock and the measurement is indicated at the oil level indicator 35. When the engine is started and runs, the indication disappears at the oil level indicator 35 because the oil 4 in the crankcase 2 is splashed up when the engine is running and is pumped up for the requisite lubrication. The measurement determined is held on the scale 36 during the trip until the ignition is turned off again, thereby terminating power to the oil level indicator 35.

According to the third possibility, the measurement is automatically performed after the ignition is turned off, i.e., when the oil 4 has an operating temperature after a trip. The measurement is performed preferably some time after the engine stops, for example with the aid of a time relay once the oil 4 has collected again in the oil pan 3. This measurement result remains displayed on the oil level indicator 35 until the ignition is turned on again. Thus, the driver can immediately detect the present oil level prior to the next start or prior to the beginning of the next trip.

Although the present invention has been disclosed with reference to preferred embodiments, modifications and changes will become apparent to one skilled in the art without departing from the scope and spirit of the invention as defined by the following claims.

I claim:

1. A system for measuring the oil level in an oil pan of an engine crankcase, the system comprising:
   a first oil level measuring device external to said oil pan and in fluid communication with the oil pan and generating a first signal indicative of the oil level within said first measuring device;
   a second oil level measuring device external to said oil pan and in fluid communication with the oil pan and said first measuring device, said second measuring device generating a second signal indicative of the oil level within said second measuring device, said second measuring device being located such that an imaginary line extends between said second measuring device, the middle of the oil pan and said first measuring device, the imaginary line corresponding the oil level in said oil pan and said first and second measuring devices; and means for indicating the oil level of the oil pan in response to a measured value derived from the first and second signals.

2. The oil measuring system according to claim 1, wherein the mean of the first and second signals is fed into said indicating means.

3. The oil measuring system according to claim 1, wherein said first and second measuring devices are equidistantly located from the middle of the oil pan.

4. The oil measuring system according to claim 1, wherein said first and second measuring devices are irregularly distanced from the middle of the oil pan.

5. The oil measuring system according to claim 1, wherein said indicating means is adjustable and the first and second signals are summed prior to being fed to said indicating means.

6. The oil measuring system according to claim 1, wherein each of said first and second measuring devices comprises a measurement container and a measuring probe arranged therein.

7. The oil measuring system according to claim 6, wherein each said measurement container has an air vent and each said measuring probe is an immersion tube sensor.

8. The oil measuring system according to claim 1, further comprising an oil supply container connected to the oil pan by means of a feeder and a metering device and having a contents transmitter, wherein the electrical measured value corresponding to the oil supply measured by said contents transmitter is fed to an oil supply indicating device.

9. The oil measuring system according to claim 1, wherein said first and second measuring devices are mounted on a frame of a vehicle powered by the engine.

10. The oil measuring system according to claim 1, wherein said first and second measuring devices are mounted on diagonal trussing which supports the engine.

11. The oil measuring system according to claim 1, wherein oil lines connect said first and second measuring devices to the oil pan to allow fluid communication therebetween.

12. The oil measuring system according to claim 11, further comprising flexible terminal clamps arranged in the oil lines between said first and second measuring devices and the oil pan.

13. The oil measuring system according to claim 11, wherein the oil lines are connected to the lowest point of the oil pan 14. The oil measuring system according to claim 1, wherein said indicating means is located on a dashboard of a vehicle powered by the engine.

15. The oil measuring system according to claim 1, wherein the measured value is displayed in the form of a display via said means for indicating the oil level during operation of the engine and wherein the display is terminated when the engine operation is terminated.

16. The oil measuring system according to claim 1, further comprising third and fourth oil level measuring devices in fluid communication with the oil pan and each other, said third and fourth measuring devices located such that another imaginary line extends between said third measuring device, the middle of the oil pan, and said fourth measuring device, the second imaginary line further corresponding to the oil level in said third and fourth measuring devices and wherein the measured value is further derived from third and fourth signals which are respectively generated by said third and fourth measuring devices and respectively indicative of oil levels within said third and fourth measuring devices.

17. The oil measuring system according to claim 16, wherein said first, second, third and fourth measuring devices are equidistantly located from the middle of the oil pan.

18. The oil measuring system according to claim 16, wherein said first, second, third and fourth measuring devices are arranged in a common horizontal plane with the middle of the oil pan.

19. The oil measuring system according to claim 16, wherein the mean of the first, second, third and fourth signals is fed into said indicating means.

20. The oil measuring system according to claim 16, wherein said third and fourth measuring devices comprise a measurement container and a measuring probe arranged therein.

21. The oil measuring system according to claim 20 wherein each said measurement container has an air vent and each said measuring probe is an immersion tube sensor.

22. The oil measuring system according to claim 16, wherein said first, second, third and fourth measuring devices are irregularly located from the middle of the oil pan.

23. The oil measuring system according to claim 16, wherein oil lines connect said third and fourth measuring devices to the oil pan to allow fluid communication therebetween.

24. The oil measuring system according to claim 23, further comprising flexible terminal clamps arranged in the oil lines between said third and fourth measuring devices and the oil pan.

25. The oil measuring system according to claim 16, wherein said third and fourth measuring devices are mounted on a frame of a vehicle powered by the engine.

26. The oil measuring system according to claim 16, wherein said third and fourth measuring devices are mounted on a diagonal trussing which supports the engine.

27. The oil measuring system according to claim 16, wherein said indicating means is adjustable and the first, second, third and fourth signals are summed prior to being fed to said indicating means.

* * * * *